S. B. HENSHAW.
GLASS FURNACE.
APPLICATION FILED OCT. 6, 1913.

1,127,245.

Patented Feb. 2, 1915.
2 SHEETS—SHEET 1.

Witnesses
Elsie Fullerton
Hamilton S. Turner

Inventor
Seth B. Henshaw
By his Attorney
Harry Smith

S. B. HENSHAW.
GLASS FURNACE.
APPLICATION FILED OCT. 6, 1913.
1,127,245.
Patented Feb. 2, 1915.
2 SHEETS—SHEET 2.
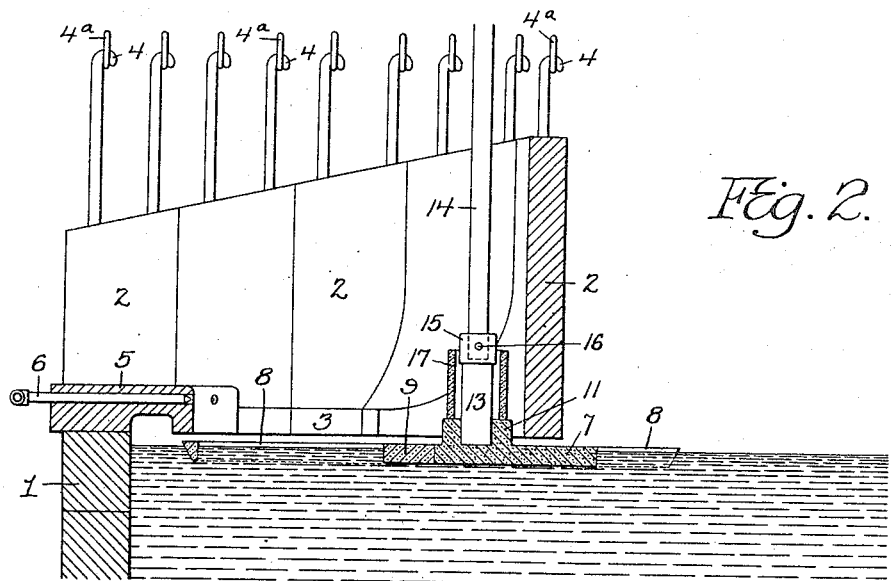
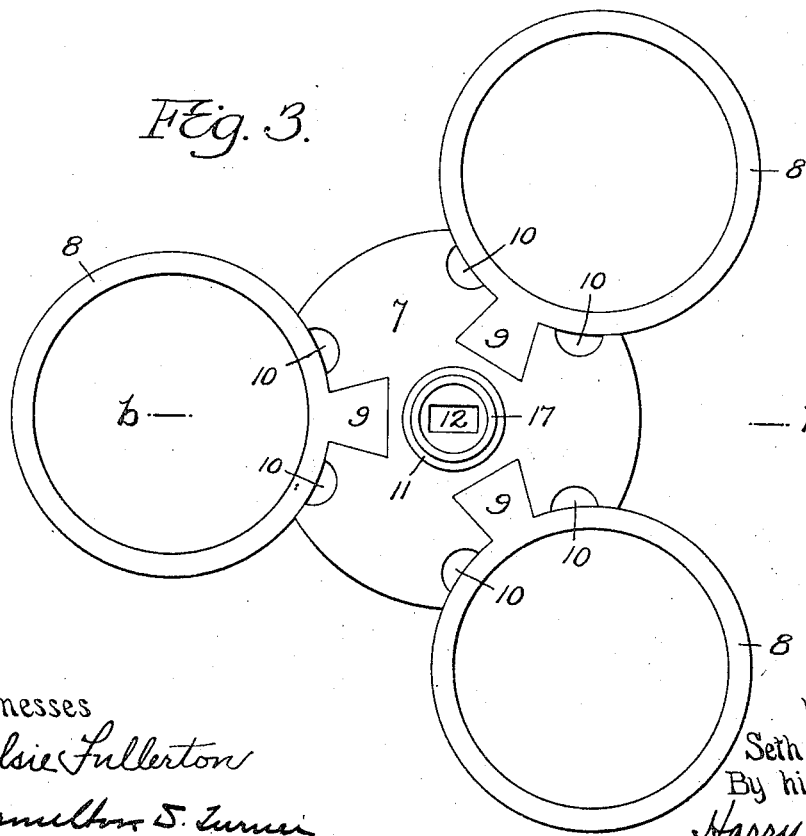
Witnesses
Elsie Fullerton
Hamilton S. Turner
Inventor
Seth B. Henshaw
By his Attorney
Harry Smith

UNITED STATES PATENT OFFICE.

SETH B. HENSHAW, OF CHARLESTON, WEST VIRGINIA, ASSIGNOR TO THE CHARLESTON WINDOW GLASS COMPANY, OF CHARLESTON, WEST VIRGINIA, A CORPORATION OF WEST VIRGINIA.

GLASS-FURNACE.

1,127,245.　　　Specification of Letters Patent.　　Patented Feb. 2, 1915.

Application filed October 6, 1913. Serial No. 793,596.

*To all whom it may concern:*

Be it known that I, SETH B. HENSHAW, a citizen of the United States, and a resident of Charleston, West Virginia, have invented certain Improvements in Glass-Furnaces, of which the following is a specification.

My invention relates to that class of glass furnaces in which a tube of glass, usually of cylindrical form, is drawn from the mass of molten glass in the furnace tank through an opening of the proper shape in a roof or cover of said tank.

Some of the features of my invention are especially applicable to that type of glass furnace in which a structure floating in the mass of molten glass has openings therein which can be caused to register with the opening in the cover, the glass being drawn first through an opening in the floating structure and then through the opening in the cover.

One of the objects of my invention is to effect the quick severance of the drawn tube of glass from the mass of molten glass in the body of the furnace tank or from that portion of the tube which is still in connection with said molten mass, a further object being to simplify and improve the means for rotating the floating structure in the molten mass, and a still further object being to insure the substantially uniform heating of the different parts of the ring members of said floating structure. These objects I attain in the manner hereinafter set forth, reference being had to the accompanying drawings, in which—

Figure 1:
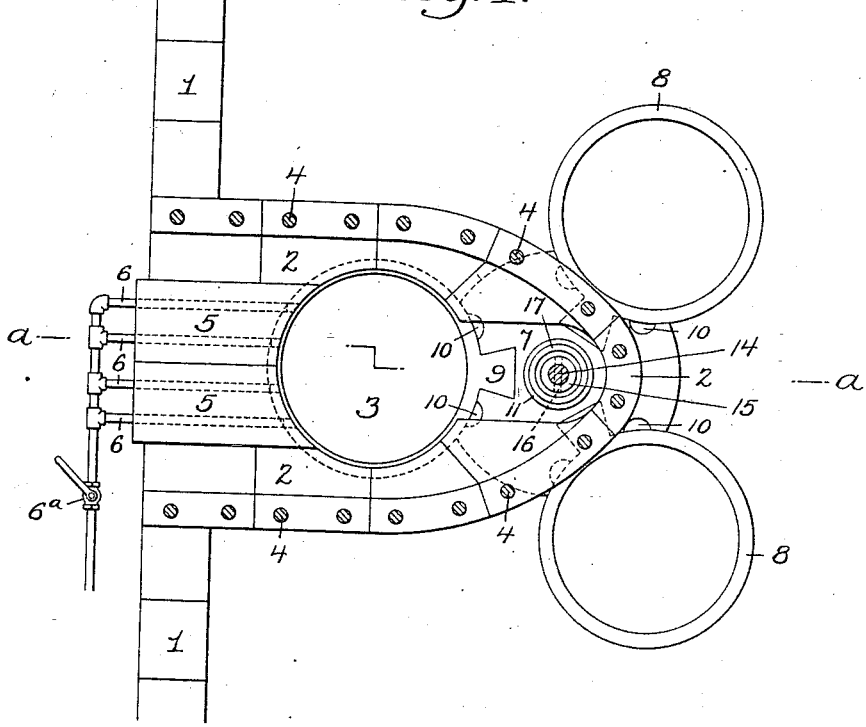
Figure 4:
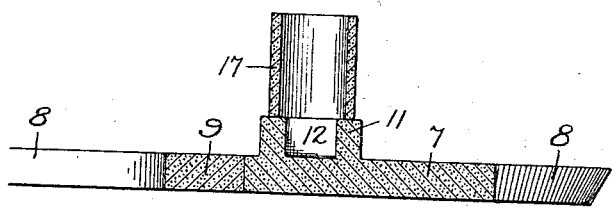

Figure 1 is a top or plan view of part of a furnace of the type to which my invention relates; Fig. 2 is a vertical section on the line a—a, Fig. 1; Fig. 3 is a top view of the floating structure on a somewhat larger scale than Figs. 1 and 2, and Fig. 4 is a vertical section on the line b—b, Fig. 3.

In the drawings, 1 represents part of the wall of a glass furnace tank, and 2 a casing located above and projecting over said tank and inclosing a working chamber which communicates with the glass in the tank through an opening 3 in the bottom of said casing 2, through which opening the tube of glass can be drawn.

The casing 2 can be supported above the tank by any suitable means, as for instance, by hooks 4 engaging links 4ª which may depend from any suitable permanent structure above the tank and the bottom of the casing 2 is formed in part by tiles or slabs 5, the inner ends of which constitute part of the boundary of the opening 3.

Embedded in the tiles 5 are a number of burner pipes 6 intended to be supplied with oil, gas, or other inflammable fluid under pressure, which, when ignited at the tips of the burner tubes, will provide a series of jets of flame projecting across the working chamber and serving to rapidly melt that portion of the glass tube subjected to their action and thereby separate that portion of the tube at and near the level of the molten mass from the portion of the tube above the opening 3, these flame jets being, by preference, started when a tube of the proper length has been drawn and being shut off during the drawing of the tube. A suitable valve 6ª controls the flow of the inflammable fluid to the burner tubes 6. The burner tubes also constitute a reinforcement for the slabs or tiles 5, and prevent the dropping of any portion of either of said tiles into the tank in case of fracture. The cutting off of the tube or cylinder in this manner leaves no cold glass, or "tail" as it is usually termed, to be subsequently refined, thereby greatly improving the quality of the product. The operation can, moreover, be quickly and conveniently performed, whereas the cutting-off operation has hitherto been the hottest and most arduous part of the work.

Floating upon the molten mass of glass in the tank is a structure comprising a central spider 7 and a series of rings 8 secured to and projecting from the peripheral portion of said spider, as shown in Fig. 3, the spider being rotatable in the mass of molten glass, so that its rings 8 can be successively brought into register with the working chamber opening 3, as set forth in the Letters Patent of H. Douchamp, No. 979,935, dated December 27, 1910.

The spider and its rings are constructed of fire clay or other refractory material, a portion of each ring being fitted to a concave recess in the periphery of the spider and being provided with a dovetailed tenon 9 which is adapted to a mortise of corresponding shape in the spider so as to secure the ring to the latter but permit of its removal or replacement.

In each of the ring-receiving concavities of the spider I form recesses 10, to which, and to the corresponding portions of the periphery of the adjacent ring, the molten glass has free access, with the effect of heating those portions of the ring adjacent to the tenon to as high or substantially as high a temperature as the projecting portions of the ring, thereby overcoming the objections likely to arise from the heating of one portion of the ring to a temperature considerably higher than another portion of the same.

The spider 7 has a central upwardly projecting boss 11, having therein an oblong recess 12 for the reception of a correspondingly shaped blade 13 which thus constitutes a wrench for turning the spider and its rings. The blade 13 depends from a vertical shaft 14, which may be provided with any suitable means for rotating the same, the blade having at its upper end a socket 15 recessed for the reception of the lower end of the shaft 14 to which it may be secured by a transverse pin 16 or other suitable means.

The blade 13 is composed of metal, and in order to protect the same from the intense heat in the working chamber of the furnace as well as to prevent any particles of rust or scale from falling therefrom into the mass of molten glass in the tank, the boss 11 has, at the top, a sleeve 17, preferably of the same refractory material as the spider 7, this sleeve surrounding the wrench 13 and being of sufficient diameter to receive within it any particles of scale or rust which may fall from said wrench, its sockets 15 or shaft 14. The wrench 13, moreover, engages the boss 11 more effectively than the external socket wrench employed in the machine of the Douchamp patent before referred to, and is of less weight and bulk than said socket wrench, and moreover, is of less dimensions than the boss 11, consequently if there is any slight lateral displacement of the spider 7 while the same is being turned said boss 11 will contact with the casing 2 and there will be no scale-dislodging contact of the wrench with said casing, or of the latter with the protective sleeve 17 and consequent risk of breakage of said sleeve. The sleeve 17 although mounted upon and rotating with the spider 7 is separate therefrom and if broken or otherwise rendered incapable of performing its proper function can be readily replaced without the necessity of renewing the entire spider.

In the present instance I have shown the rotatable spider as provided with three projecting rings, but it may have more or less than this number of rings, if desired.

I claim:

1. The combination of a glass furnace having a working chamber casing which projects over the mass of molten glass and has an opening therein through which the glass can be drawn, tiles constituting part of said casing, and burner pipes embedded in said tiles and discharging from the inner ends of the same across said opening.

2. The combination, in a glass furnace, of a structure floating in the mass of molten glass and comprising a central spider, and ring members carried thereby and projecting therefrom, said spider having recesses in those portions in which the ring members are seated, thereby permitting access of the molten glass to those portions of the ring members which cover said recesses.

3. The combination of a glass furnace having a working chamber casing which projects over the mass of molten glass and has an opening therein through which the glass can be drawn, and means for projecting flame jets across said opening, a rotatable structure floating in the mass of molten glass and having openings therein which, as the structure is rotated, are successively brought into line with the drawing opening of the furnace, said structure having a socket therein, a wrench for engaging said socket to turn the structure, and a detachable tubular shield of refractory material surrounding and protecting that portion of the wrench which would otherwise be acted upon by the flame jets projecting across the drawing opening.

4. The combination of a glass furnace having a working chamber casing which projects over the mass of molten glass and has an opening therein through which the glass can be drawn, and means for projecting flame jets across said opening, a rotatable structure floating in the mass of molten glass and having openings therein which, as the structure is rotated, are successively brought into line with the drawing opening of the furnace, said structure having a socket therein, a wrench for engaging said socket to turn the structure, and a sleeve of refractory material separate from the rotatable structure but mounted upon the same and rotating with the same, said sleeve surrounding that portion of the wrench which is in the path of the flame jets projected across the drawing opening of the furnace.

5. The combination, in a glass furnace, of a rotatable structure floating in the mass of molten glass, said structure having a projecting boss with recess therein, a rotatable shaft having a member for engaging said recess, and a sleeve of refractory material extending upwardly from said boss and surrounding said engaging member.

In testimony whereof, I have signed my name to this specification, in the presence of two subscribing witnesses.

SETH B. HENSHAW.

Witnesses:
ANGUS W. McDONALD,
J. F. BROWN.